UNITED STATES PATENT OFFICE.

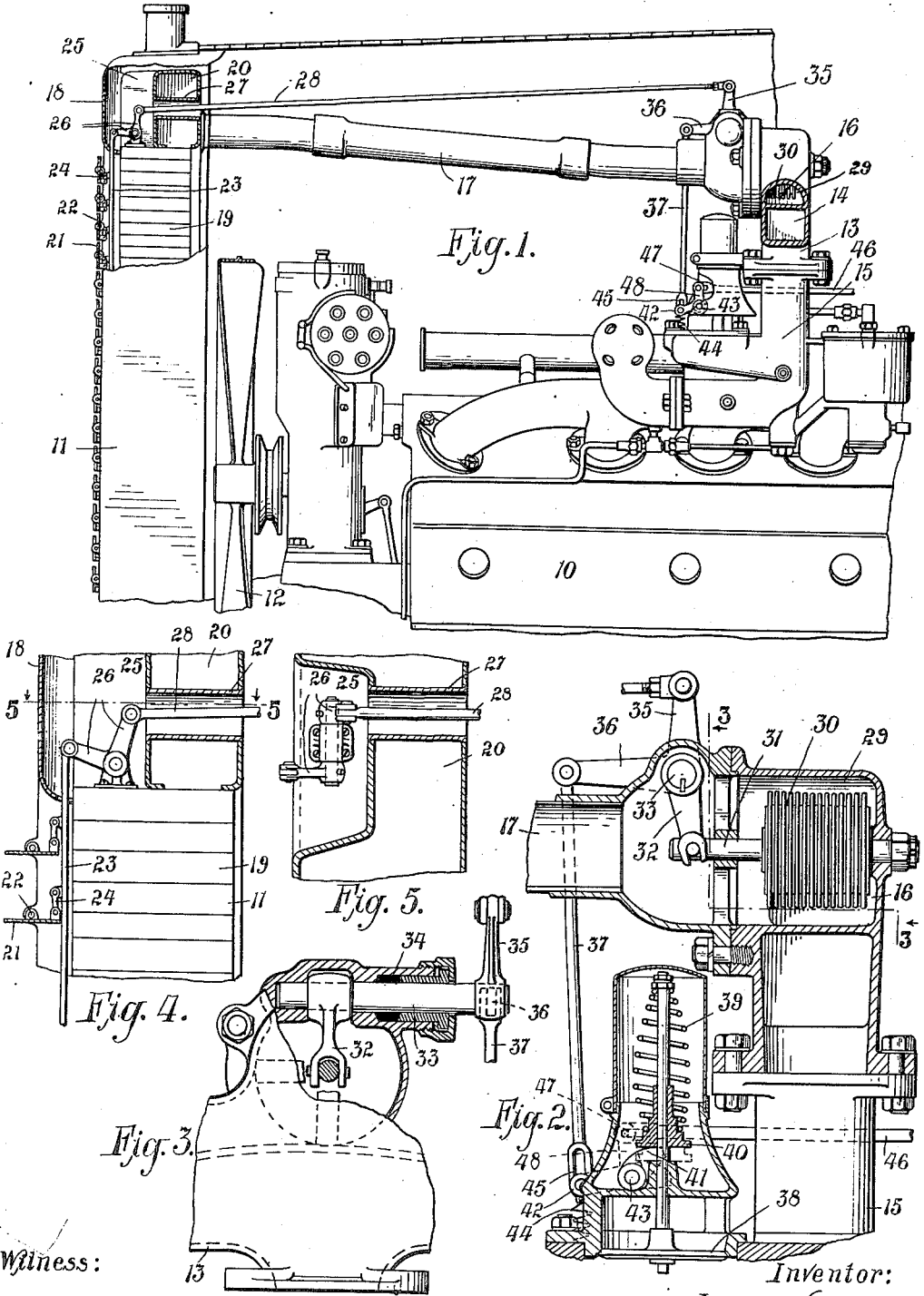

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

1,424,427.         Specification of Letters Patent.      Patented Aug. 1, 1922.

Application filed July 17, 1916. Serial No. 109,854.

*To all whom it may concern:*

Be it known that I, JESSE G. VINCENT, a citizen of the United States, and resident of Detroit, Wayne County, State of Michigan, have invented certain new and useful Improvements in Motor Vehicles, of which the following is a specification.

This invention relates to motor vehicles and particularly to the control of the cooling of the motor and the control of the carburetor.

One of the objects of the invention is to provide thermostatically controlled means for adjusting the richness of the mixture of the motor carburetor.

Another object of the invention is to provide thermostatic control for the air passing through the radiator of the vehicle.

Another object of the invention is to provide a single thermostat and connections for controlling the adjustment of the carburetor and the flow of air through the radiator.

Other objects of the invention will appear from the following description taken in connection with the drawings which form a part of this specification, and in which—

Fig. 1 is a side elevation and part sectional view of the forward part of a motor vehicle embodying this invention.

Fig. 2 is an enlarged vertical section showing the thermostat and carburetor control.

Fig. 3 is a transverse section and part elevation on the line 3—3 of Fig. 2.

Fig. 4 is an enlarged view of the upper part of the radiator shown in Fig. 1; and Fig. 5 is a horizontal section on the line 5—5 of Fig. 4.

Referring to the drawings, 10 represents a motor set on the forward part of the motor vehicle, and 11 is the radiator usually mounted forwardly of the motor. A fan 12 may be mounted at the rear of the radiator for increasing the circulation of air therethrough.

A V type motor is illustrated and it is provided with an intake manifold 13, which has a passage 14 leading from a carburetor 15 to the intake ports of the motor. The manifold also has a passage 16 through which the water from the water-jacketed cylinders of the motor is led to a pipe 17, which connects with the upper part of the radiator 11.

As shown, the radiator 11 above referred to comprises a suitable casing 18, in which are a core 19 and a tank 20 mounted above the core. The pipe 17 empties into this tank 20. The core 19 provides water passages from the tank 20 down to a tank, not shown, at the bottom of the radiator, and air passages that lead from its front face through to the rear. It is through these air passages that the air is drawn by the fan 12, or is forced by the forward movement of the vehicle for the purpose of cooling the water in the radiator. It will be understood that a suitable pump driven by the motor draws the water from the bottom of the radiator and supplies it to the jackets of the motor where it again passes upwardly through the passage 16 of the inlet manifold and through the pipe 17 to the radiator again, thus keeping up a constant circulation.

In the form of the invention shown, the front of the radiator 11 is provided with a series of horizontally extending shutters 21, each of which is pivoted as at 22 and connected to an operating rod 23 as by links 24. The tank 20 is formed with a front recess 25, in which is mounted a bell crank 26, and a tubular passage 27 makes an opening in the tank for an operating rod 28, which extends rearwardly over the top of the motor. By the movement of this rod 28 the shutters 21 may be moved to open or close the front of the radiator, the shutters being shown in closed position in Fig. 1 and in open position in Fig. 4. Thus the flow of air through the radiator core 19 is controlled by the position of the shutters 21.

Arranged in a suitable pocket 29 in the passage 16 of the inlet manifold, is a thermostat 30 of suitable construction and being adapted to expand with the heat of the water passing through the pocket. A stem 31 connected to the thermostat operates an arm 32 on a shaft 33, which shaft extends through a packing 34 in the wall of the passage 16 and is provided on its outer end with two arms 35 and 36, the former of which is connected to the rear end of the operating rod 28 above referred to. The arm 36 is pivotally connected to a downwardly extending rod 37, which is adapted to control the position of the carburetor adjusting means.

The carburetor 15 above referred to is provided with means for adjusting the richness of the mixture, in the form of an air valve 38 of the poppet type provided with a spring 39 for yieldingly retaining it in closed position. It will be understood that the valve 38 is opened by the suction of air passing into the carburetor and the lighter the tension on the spring 39 the greater volume of air that will be admitted and the leaner the mixture will be. Increasing the tension of the spring 39 tends to decrease the volume of air and to thereby increase the richness of the mixture formed by the carburetor.

The lower end of the spring 39 rests on a block 40, which is adjustable vertically by a cam 41 of a bell crank lever 42 pivoted as at 43. This cam 41 is yieldingly retained in its upper position as shown in full lines in Fig. 2 by a spring device 44 of any suitable construction, but shown as a coil spring connected to the end of the arm 42 and to a suitable stationary part of the carburetor. It is understood that the spring device 44 is sufficiently strong to overcome the tension of the spring 39, but for the purpose of permitting operation of the cam 41 by the thermostat 30 the spring 44 will sufficiently yield. The connection between the rod 37 and the cam 41 is through a pin and slot device 45 by which the arm 42 may be raised by the rod 37, or said arm 42 may move upwardly without moving the rod 37. This connection permits of the cam 41 being moved independently of the thermostat and for this purpose a rod 46 adapted to be manually operated, is connected by a pin and slot connection 47 to an arm 48 of said cam 41. Thus the cam 41 may be moved by the thermostat without affecting the position of the rod 46, or it may be moved by the rod 46 without affecting the position of the rod 37.

It will be understood that the device hereinabove described is automatic in its action in that when the motor is cold the thermostat 30 is contracted and will thereby hold the shutters 21 in closed position and the spring 39 under its greatest tension, whereby the air is shut off from the radiator and a rich mixture only, is permitted to be formed in the carburetor, whereas upon the warming up of the motor the thermostat 30 will expand and gradually open up the shutters 21 and decrease the tension on the spring 39 for permitting a greater amount of air to enter the carburetor. If desired, however, the tension of the air valve spring 39 may be lessened by the manual operation of the rod 46 without in any way interfering with the other functions of the thermostat 30.

It will be understood that other forms may be made without departing from the spirit or scope of this invention.

Having thus described my invention, what I claim and desire to secure by Letters Patent is:—

1. In a motor vehicle, in combination, a motor, a carburetor having means for adjusting the richness of the mixture, a radiator, water connections from the motor to the radiator, means for controlling the flow of air through the radiator, a thermostat, and connections from the thermostat to said carburetor adjusting means and said air controlling means.

2. In a motor vehicle, in combination, a motor, a carburetor having means for adjusting the richness of the mixture, a radiator, water connections from the motor to the radiator, means for controlling the flow of air through the radiator, a thermostat mounted in said water connections, and connections from the thermostat to said carburetor adjusting means and said air controlling means.

3. In a motor vehicle, in combination, a motor, a carburetor having means for adjusting the richness of the mixture, a radiator, water connections from the motor to the radiator, movable shutters in front of the radiator, a thermostat, and connections from the thermostat to the carburetor and the shutters.

4. In a hydrocarbon motor, in combination, a carburetor having means for adjusting the richness of the mixture, means for controlling the flow of air to the motor cooling means, a thermostat, and connections from said thermostat to said carburetor adjusting means and said air controlling means.

5. In a hydrocarbon motor, in combination, a carburetor having means for adjusting the richness of the mixture, means for controlling the flow of air to the motor cooling means, a thermostat, and connections from said thermostat to said carburetor adjusting means and said air controlling means and means for separately adjusting the carburetor.

6. In a hydrocarbon motor, in combination, a carburetor having a spring closed valve, a spring device tending to retain a relatively high tension on the spring of said valve, a thermostat, operating means between said thermostat and said device including a pin and slot connection, and means for manually adjusting the valve spring.

7. In a hydrocarbon motor, in combination, a carburetor having a spring closed valve, a spring device tending to retain a relatively high tension on the spring of said valve, a thermostat, operating means between said thermostat and said device including a pin and slot connection, and means for manually lessening the tension of the valve spring independently of the thermostat.

In testimony whereof I affix my signature.

JESSE G. VINCENT.